United States Patent [19]

Clitherow

[11] Patent Number: 5,479,494
[45] Date of Patent: Dec. 26, 1995

[54] VIRTUAL CALLING CARD SYSTEM

[75] Inventor: Michael T. Clitherow, White House Station, N.J.

[73] Assignee: AT&T Corp., Murray Hill, N.J.

[21] Appl. No.: 956,709

[22] Filed: Oct. 5, 1992

[51] Int. Cl.⁶ ............... H04M 15/00; H04M 17/00; H04M 3/42; H04M 1/00
[52] U.S. Cl. ............. 379/144; 379/112; 379/216; 379/289; 379/355
[58] Field of Search ............... 379/91, 95, 144, 379/200, 216, 289, 355, 112

[56] References Cited

U.S. PATENT DOCUMENTS

| | | | |
|---|---|---|---|
| 3,938,091 | 2/1976 | Atalla et al. | 379/197 |
| 4,162,377 | 7/1979 | Mearns | 179/18 |
| 4,748,661 | 5/1988 | Edelstein et al. | 379/289 |
| 4,885,762 | 12/1989 | Suzuki et al. | 379/200 |
| 4,899,373 | 2/1990 | Lee et al. | 379/144 |
| 4,933,965 | 6/1990 | Hird et al. | 379/144 |
| 4,935,956 | 6/1990 | Hellwarth et al. | 379/144 |
| 5,157,717 | 10/1992 | Hitchcock | 379/144 |
| 5,163,086 | 11/1992 | Ahearn et al. | 379/144 |
| 5,181,238 | 1/1993 | Medamana et al. | 379/95 |
| 5,223,699 | 6/1993 | Flynn et al. | 379/144 |
| 5,272,748 | 12/1993 | Davis | 379/216 |
| 5,272,749 | 12/1993 | Masek | 379/216 |
| 5,287,403 | 2/1994 | Atkins et al. | 379/144 |

OTHER PUBLICATIONS

Bellcore OSSGR: Special Billing Features (FSD 85 Series), Technical Reference TR–NWT–001177, Issue 1, Feb. 1991, OSSGR FSD 85-01-0100; Calling Card Billing.
"Operator Services Position System", AT&T Technical Journal, vol. 68, No. 6, Nov./Dec. 1989, pp. 1–62.

*Primary Examiner*—Stephen Chin
*Assistant Examiner*—Vijay Shankar
*Attorney, Agent, or Firm*—John A. Caccuro

[57] ABSTRACT

A calling card subscriber is allowed to choose at least some of the digits of his or her calling card number to form a virtual card number. Associated with the virtual card number is a standardized card number i.e., a number conforming to the Bellcore calling card numbering plan. When the subscriber uses the virtual card number to make a calling card call, the virtual card number is mapped into the standardized number. The latter is then used by the telephone system for subsequent validation and billing.

22 Claims, 5 Drawing Sheets

| CALLING CARD MNEMONIC | VIRTUAL CALLING CARD NUMBER | STANDARDIZED CALLING CARD NUMBER |
|---|---|---|
| MY CARD | 692273 | 501 234 5678 9101 |
| 10 16 32 | 101632 | 201 768 9000 1234 |
| JENNIFER | 53664337 | 987 654 3210 4321 |
| 503 MICKEY | 503642539 | 765 432 1234 6789 |
| 504 08 06 81 | 504080681 | 876 543 210 90123 |
| 505 BOBBY | 50526229 | 678 901 2345 6781 |
| JANE JONES | 526356637 | 3790 012345 6789 |

| CALLING CARD MNEMONIC | VIRTUAL CALLING CARD NUMBER | STANDARDIZED CALLING CARD NUMBER |
|---|---|---|
| MY CARD | 692273 | 501 234 5678 9101 |
| 10 16 32 | 101632 | 201 768 9000 1234 |
| JENNIFER | 53664337 | 987 654 3210 4321 |
| 503 MICKEY | 503642539 | 765 432 1234 6789 |
| 504 08 06 81 | 504080681 | 876 543 210 90123 |
| 505 BOBBY | 50526229 | 678 901 2345 6781 |
| JANE JONES | 526356637 | 3790 012345 6789 |

VIRTUAL CALLING CARD SYSTEM

TECHNICAL FIELD

This invention relates to communications switching systems, and more particularly, to a method and system for administering and using calling cards for telephone calls.

BACKGROUND OF THE INVENTION

Telephone calling cards provide a convenient way for business and residential telephone subscribers to charge the costs of telecommunications services. This convenience can be attributed in part to a standardized calling card numbering plan administered by Bell Communication Research (Bellcore) which permits calling card calls to be billed to appropriate calling card subscribers regardless of the operator service and/or communications carrier used to complete these calls.

The Bellcore standards, set forth in Feature Specific Document OSSGR FSD85-01-0100 TR-NWT-001177, offer a card issuer three numbering plan options. In the first option, the card issuer provides the calling card subscriber with a Calling Card Number (CCN) comprised of a 10-digit Calling Card Account Number (CCAN) and a 4-digit Personal Identification Number (PIN). Typically, the 10-digit calling card account number, also called "line-based number", is the calling card subscriber's residential or business telephone number.

The second and third options of the Bellcore numbering plan provide for non-line-based card numbers. According to the second option, in particular, a card issuer can use as a calling card number a special billing number which also follows the format of a 10-digit number followed by a 4-digit PIN. However, in contradistinction to the line-based numbers, the first ten digits of the calling card number in the second option are different from the card subscriber's telephone number. Furthermore, the first four digits of the 10-digit number form a prefix called "Card Issuer Identification Number" (CIID) assigned by Bellcore to uniquely identify each card issuer.

The third option provides for non-line-based numbers referred to as Alternate Calling Card Numbers (ACCNs). These numbers follow an international numbering plan standardized by the Comite Consultatif International de Telephonie et de telegraphie (CCITT) and are comprised of a) a 2-digit major industry identifier code (e.g., the code "89" for the telecommunications industry b) a 1-to-3 digit world zone or country code (e.g., the code "1" for the North American Dialing Plan) c) a card issuer code (up to three digits), d) an individual account number (up to 12 digits) and an optional PIN (up to 16 digits). In North America, this option is sometimes called the 891 plan. The first 6 digits of the "891" plan form a prefix that uniquely identifies a card issuer. That prefix, like the CIID prefix of the second option, is used in the routing of calling card validation queries to the card issuer's validation database. The first three digits of the prefix can be omitted for domestic calls but are required for international calls. For line-based numbers, the area code is used to determine the specific RBOC that has issued the calling card.

Some card issuers, such as a number of Regional Bell Operating Companies (RBOCs) have implemented the first option of the Bellcore numbering plan primarily because line-based numbers are easily remembered by calling card users. However, because of this user-friendliness, line-based numbers are more readily used as a means for illegal access to telecommunications services, causing significant economic losses for calling card issuers and account reconciliation problems for calling card subscribers. In addition, when a calling card subscriber changes his or her telephone number, a change to his or her calling card number is also warranted. Additionally, card issuers that are also communications carriers, such as AT&T and the RBOCs have received complaints from their calling card customers expressing anger at the fact that calling card calls initiated from public telephones owned or operated by Alternative Operator Services (AOS) companies are billed to those calling card subscribers at a significantly higher rate than the tariff rates charged by those carriers for equivalent calling card calls handled by these carriers. Apparently, such calling card subscribers were of the belief, which is erroneous, that the use for a particular call of a calling card issued by a particular communications carrier necessarily means that the call will be handled by that carrier.

In response to these problems, some calling card issuers favor the use of non-line-based numbers, i.e., numbers based on the second or the third option of the Bellcore numbering plan. These options offer significant advantages over the first one. For example, a non-line-based number can be a "cradle to grave" number that does not need to be changed when the card subscriber gets a new telephone number. In addition, decoupling a card number from the card subscriber's telephone number decreases communication carriers' vulnerability to theft of communications services. Moreover, non-line-based numbers, unlike line-based numbers, offer no information from which a billing number can be inferred. Thus, when a non-line-based number is used, AOS companies have no choice but to prompt callers to enter a Carrier Access Code (CAC) so that the caller can be connected to a communications carrier which is capable of validating the card number. Hence, the latter carrier rather than the AOS company will ultimately route the call, which will then be billed at the tariff rate established by the carrier.

However, a major drawback associated with non-line-based numbers is that they are more difficult to remember than line-based numbers. This, moreover, makes it more likely that calling card users will engage in practices that defeat the intended security purposes of the card issuers. Thus, providing convenient access to telecommunication services for calling card users while enforcing user-transparent security measures is still a problem for card issuers and communication carriers alike.

SUMMARY OF THE INVENTION

In accordance with the present invention, a calling card subscriber is allowed to choose at least some of the digits of his or her calling card number to form a virtual card number. Associated with the virtual card number is a standardized card number i.e., a number conforming either to the aforementioned Bellcore standard or to the commercial credit card numbering plan standards formulated by the International Standards Organization (ISO) and the American National Standards Institute (ANSI). Alternatively, the standardized number can be a financial account number, such as a debit card number, a checking account number or an electronic fund transfer number. When the subscriber uses the virtual card number to make a calling card call, the telephone system maps the virtual card number into the standardized number. The latter is then used by the telephone system for subsequent validation and billing.

Advantageously, the concept of a virtual card number frees the card issuer from some or all of the rigid requirements of the standards, such as number of digits in the calling card number, number of digits in the personal identification number, etc. Thus, the virtual card subscriber can pick almost any short or long combination of digits that can be quickly dialed and/or easily remembered, such as an alphabetic mnemonic, date of birth, wedding anniversary, etc. Additionally, the fact that the virtual card number is mapped to a standardized number prior to validation and billing allows the card issuer to use existing calling card validation and billing systems without having to modify those systems to take account of the fact that non-standard card numbers, i.e., the virtual card numbers have been issued to subscribers.

In a first embodiment of the invention, all the digits in the virtual card number are subscriber-selectable. A special character, such as an asterisk, may precede the sequence of digits m identify the card number as a virtual card number. Since there is no issuer-identifying prefix in a virtual card a number, there is no way for authorized agents of a card issuer, i.e., a Local Exchange Carrier (LEC) handling an intra-LATA call being billed to an Interexchange Carrier-issued card, to identify who the issuer is so that a query can be launched to the card issuer's validation database to authenticate the virtual card number, unless the issuers were to supply to all agents, lists of the virtual card numbers they have issued. For various reasons, this is something that some virtual card issuers may not want to do. In order to solve this problem, the agent may prompt the card user to identify the card issuer. If the caller is unable to identify the card issuer, validation queries may be launched to some or all virtual card number issuers' validation databases in an attempt to authenticate the virtual card number.

In a second embodiment of the invention, the virtual card is constrained to include a prefix identifying the card issuer so that the calling card number can be authenticated by authorized agents forwarding validation queries to the card issuer validation's database. This approach, on the other hand, is somewhat less advantageous from the subscriber perspective because not all of the digits in the virtual card number are subscriber-selectable.

DETAILED DESCRIPTION

Figure 1:
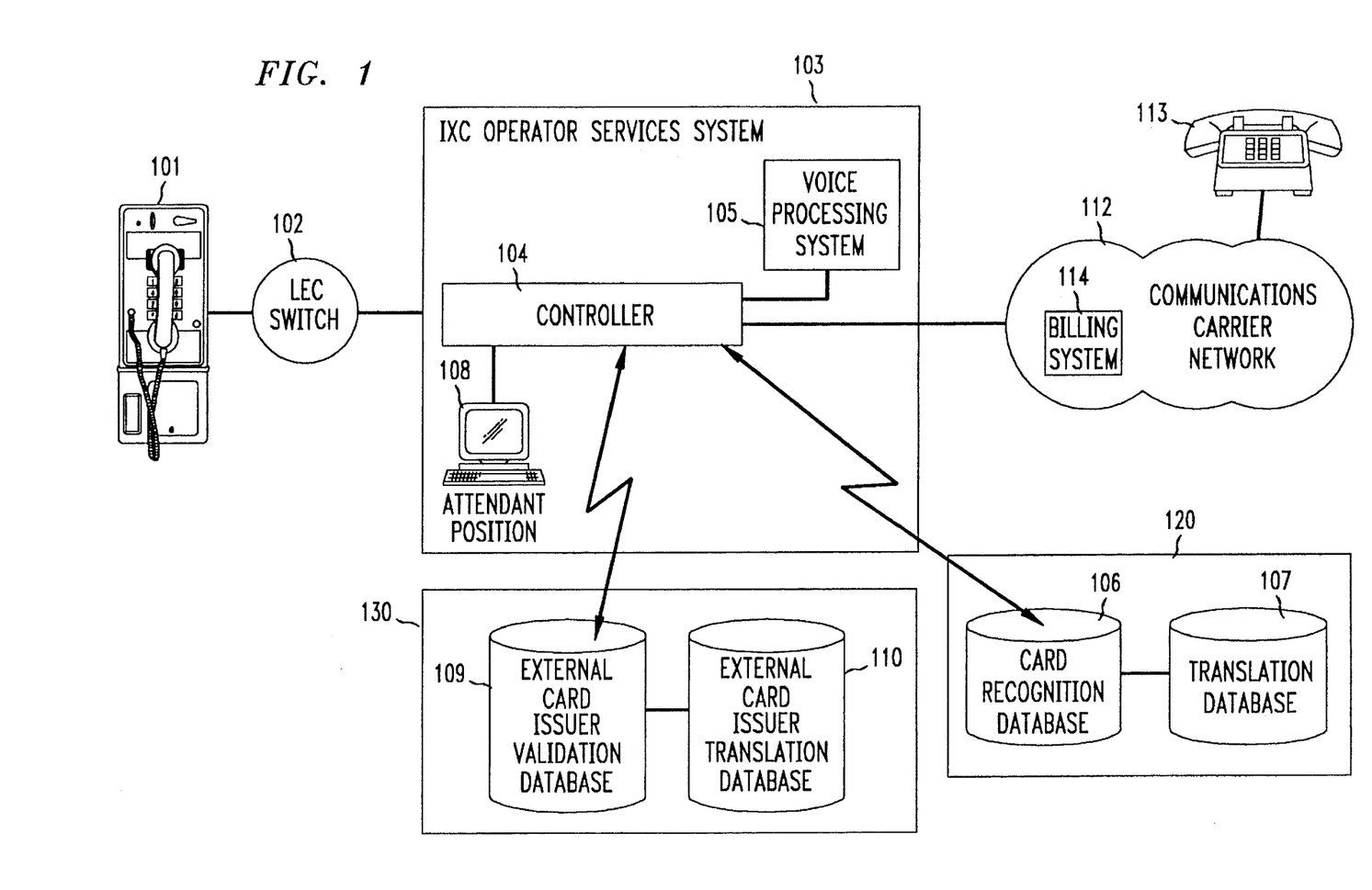
FIG. 1 shows a block diagram of a communication switching system arranged to validate virtual calling card numbers and to complete calling card calls in accordance with the invention.

FIG. 1 shows a block diagram of a communication switching system arranged to validate virtual calling card numbers and to complete calling card calls in accordance with the invention. In FIG. 1, a calling card call is placed by a caller at public telephone set 101 by dialing "0" followed by a ten-digit telephone number. The call is routed to Local Exchange Carrier (LEC) switch 102 which, upon detecting the initially dialed "0" routes the call to an operator services system. Specifically, LEG switch 102 determines, based on the digits dialed by the caller, whether the call should be processed by its own operator services system for LEC-handled calls, or the operator services of an Interexchange Carrier (IXC), for IXC-handled calls. In this example, the call is to be handled by an IXC and accordingly, the call is routed to IXC-operated operator services system (OSS) 103. Intra-LATA calling card calls can be handled by IXC-operated OSS 103 when a) there is an agreement between the LEC and the IXC for such an arrangement, and b) the caller enters a carrier identifying code before the telephone number of the desired called party.

Operator Services System 103 is comprised of a) controller 104 which is the point of entry for all calling card calls processed by OSS 103, and b) voice processing system 105 which presents announcements to, and collects information from, the caller. Controller 104 provides communication paths between a caller, voice processing system 105, card processing system 120 and 130 and communications carrier network 112, the latter comprising in general, LEC facilities and IXC facilities and billing system 114. The latter is a computer system arranged to process billing records generated at the end of a call by communications carrier network 112. Controller 104 also supervises and controls the operations of voice processing system 105 by sending specific signals to voice processing system 105 to instruct the latter to perform specific tasks. In addition, controller 104 sends validation request messages to internal card processing system 120 or external card processing 130. Internal card processing system 120 is comprised of card recognition database 106 which retrieves and checks the credit worthiness of standardized calling card numbers stored therein, and d) translation database 107 which maps virtual calling card numbers to standardized calling card numbers in accordance with the invention. Similarly, external card processing system 130 includes external card issuer validation database 109 and external card issuer translation database 110. The only difference between internal card processing system 120 and external card processing system 130 is that the former belongs to the carrier processing the calling card transaction while the latter belongs to another carrier or entity which has authorized the carrier processing the card transaction to access its card processing system.

Card recognition database 106 contains standardized calling card numbers issued either by the carrier which operates OSS 103 or by entities for which the latter carrier is an authorized agent to charge calls to cards issued by such entities. Card recognition database 106 is arranged to analyze a sequence of digits to determine whether a calling card number is a line-based number, a special billing number, or an alternate account calling card number based on the unique criteria set forth in the aforementioned Bellcore standard. If none of those criteria are met, card recognition database 106 infers that the card number is a virtual card number. Alternatively, detection of a special character such as an asterisk prepended to the sequence of digits in the card number indicates to card recognition database 106 that the card number is a virtual card number. Card recognition database 106 is also designed to recognize the Card Issuer Identifier Number (CIID) prefix or the CCITT-based prefix of other entities authorized under an agreement, such as the Shared Network Facilities Agreement between AT&T and some LECs, to cross-validate calling cards numbers issued by different entities. When a caller enters a calling card number in response to a prompt from voice processing system 105, controller 104 forwards the received calling card number to card recognition database 106 which determines whether the received number has a valid prefix. If so, card recognition database 106 compares the prefix to entries in a stored routing table (not shown) to determine whether a query to external card issuer validation database 109, i.e., a cross-validation is warranted. If no cross-validation is required, card recognition database 106 analyzes the sequence of digits and the format of the received calling card number to determine whether it is a virtual card number. If the calling card number is a virtual card number, card recognition database 106 forwards the received number to translation database 107 which is arranged to map virtual card numbers to standardized numbers. If the received number is found within translation database 107, the latter returns the associated standardized number to card recognition database 106. Otherwise, it returns an error message thereto.

When cross-validation is required, card recognition database 106 identifies the card issuer from the prefix in the card number by matching that prefix to an entry in a routing table (not shown). The card issuer identification information is then forwarded to controller 104 which launches a query via a signaling network (not shown) to external card issuer validation database 109 to authenticate the card number. For virtual card numbers, external card issuer validation database 109 forwards the card number to external card issuer translation database 110 which performs similar functions to translation database 107. A code is then returned to controller 104 to either authorize or block the call.

After a predetermined number of unsuccessful attempts to validate a card number, a denial-of-service code is returned to controller 104, which terminates the call. When an authorization code is returned to controller 104 by either card recognition database 106 or external card issuer validation database 109, controller 104 sends the called number to communications carrier network 112, which routes the call to the called party at station set 113.

Figure 2:
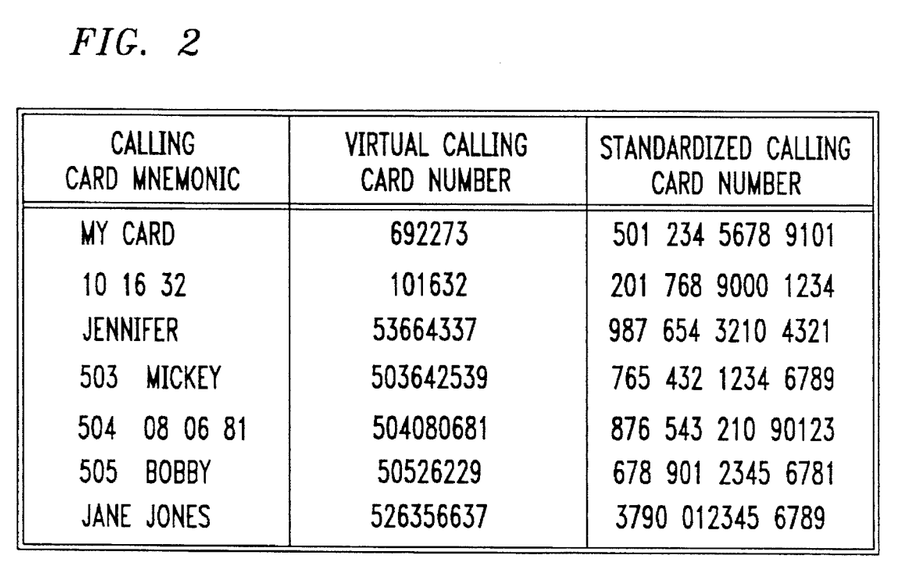
FIG. 2 is a translation table that maps virtual card numbers into standardized calling card numbers.

FIG. 2 shows an illustrative portion of a translation table that may be stored in translation database 107 or external card issuer translation database 110. The translation table maps virtual calling card numbers to standardized calling card numbers. FIG. 2 shows that a virtual calling card number can be either a free-form number or a prefix-formatted number. In a free-form calling card number, the card subscriber has almost complete control over the selection of the digits in the card. More specifically, except as described below, no restriction is imposed by a card issuer on the number of digits or the type of digits at a specific position in the sequence of digits that can be chosen by a calling card subscriber. Every letter of the English alphabet, except for "Q" and "Z" (which are mapped respectively to 7 and 9 in the present invention) appears as a numerical digit key of the standard telephone keypad. Thus, a virtual card number can be expressed either as a string of digits or as an alphabetic string which is equivalent to a string of digits. Hence, as illustrated in FIG. 2, subscribers may remember their virtual card numbers by using alphabetic mnemonics (as shown on some of the entries in the first column on the left hand side). The telephone system, however stores the virtual card number in the equivalent numerical form. Thus, the virtual card mnemonic "MY CARD" is equivalent to the virtual card number 692273. For security purposes, the calling card subscriber may be advised to choose a mnemonic that cannot be easily guessed by a fraud perpetrator. Furthermore, the four digits in any CIID-based prefix or the 3-to-6 digits in any CCITT-based prefix cannot be selected by a card subscriber as the first 3-to-6 digits in the sequence of digits in a virtual card number. Similarly, the first three digits of a 10-digit virtual card number cannot match any area code number in the North American Dialing Plan unless the virtual card number has fewer than fourteen digits.

A prefix-formatted virtual card number, by contrast, is a sequence of digits which has a prefix at the beginning of the sequence. As mentioned above, the prefix, which can be 3-to-6 digits long, identifies uniquely the card issuer and is primarily used for calling card cross validation purposes. The remaining digits in the prefix-formatted virtual card number can be selected by the calling card subscriber without restrictions except for uniqueness. For example, for the calling card "503 MICKEY" the prefix "503" identifies the card issuer, in this case, AT&T, and MICKEY represents the mnemonic selected by the subscriber.

Associated with every virtual card number is a standardized card number that is displayed in the column in the far right hand-side of FIG. 2. The standardized number can be a line-based number or a non-line-based number. Alternatively, the standardized number can be a commercial credit card number conforming to the International Standards Organization (ISO) and the American National Standards Institute (ANSI) numbering plan. An example of a standardized number which is a commercial credit card number associated with a virtual calling card number is illustrated in the last record of FIG. 2. Although not illustrated in FIG. 2, it is to be understood that the standardized number can also be a debit card number, an Electronic Fund Transfer (EFT) number or some other type of financial account number conforming to a numbering plan formulated by an industry-wide standard body in the financial services industry.

Figure 3:
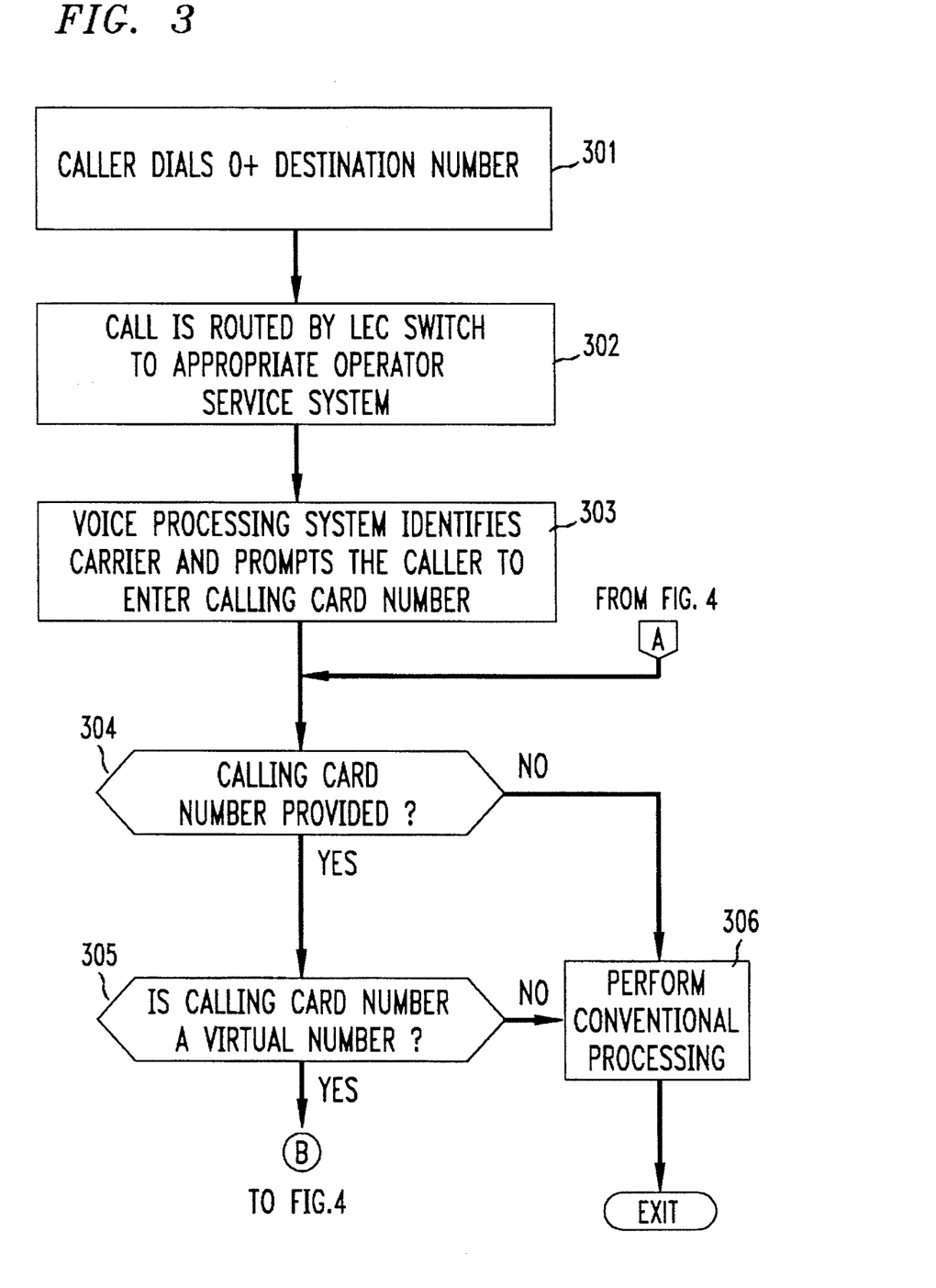
FIGS. 3a, 3b, and 3c presents, in flow diagram format, actions taken and decisions formulated by different elements of the communication switching system of FIG. 1 to implement the invention.
Figure 4:
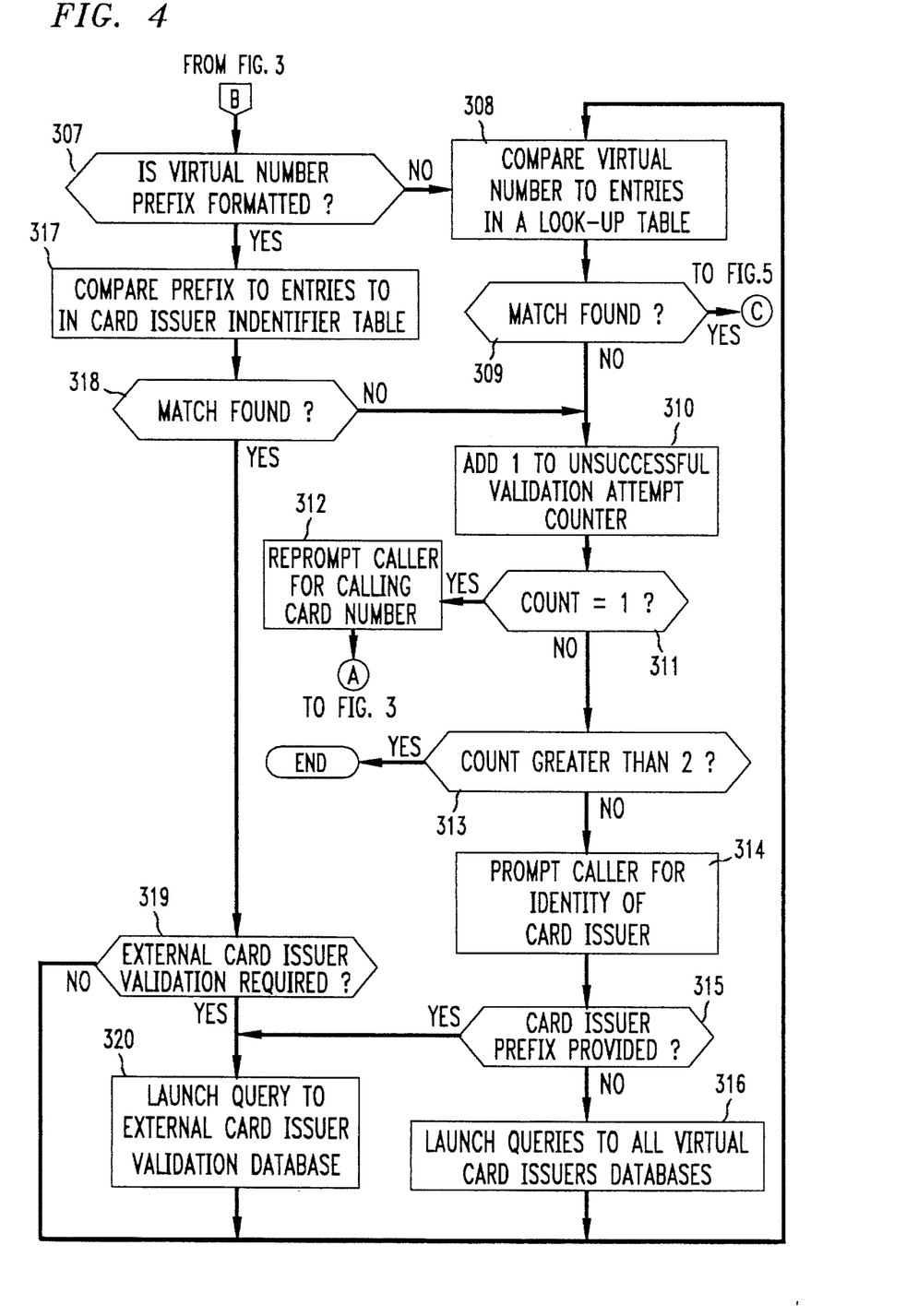
Figure 5:
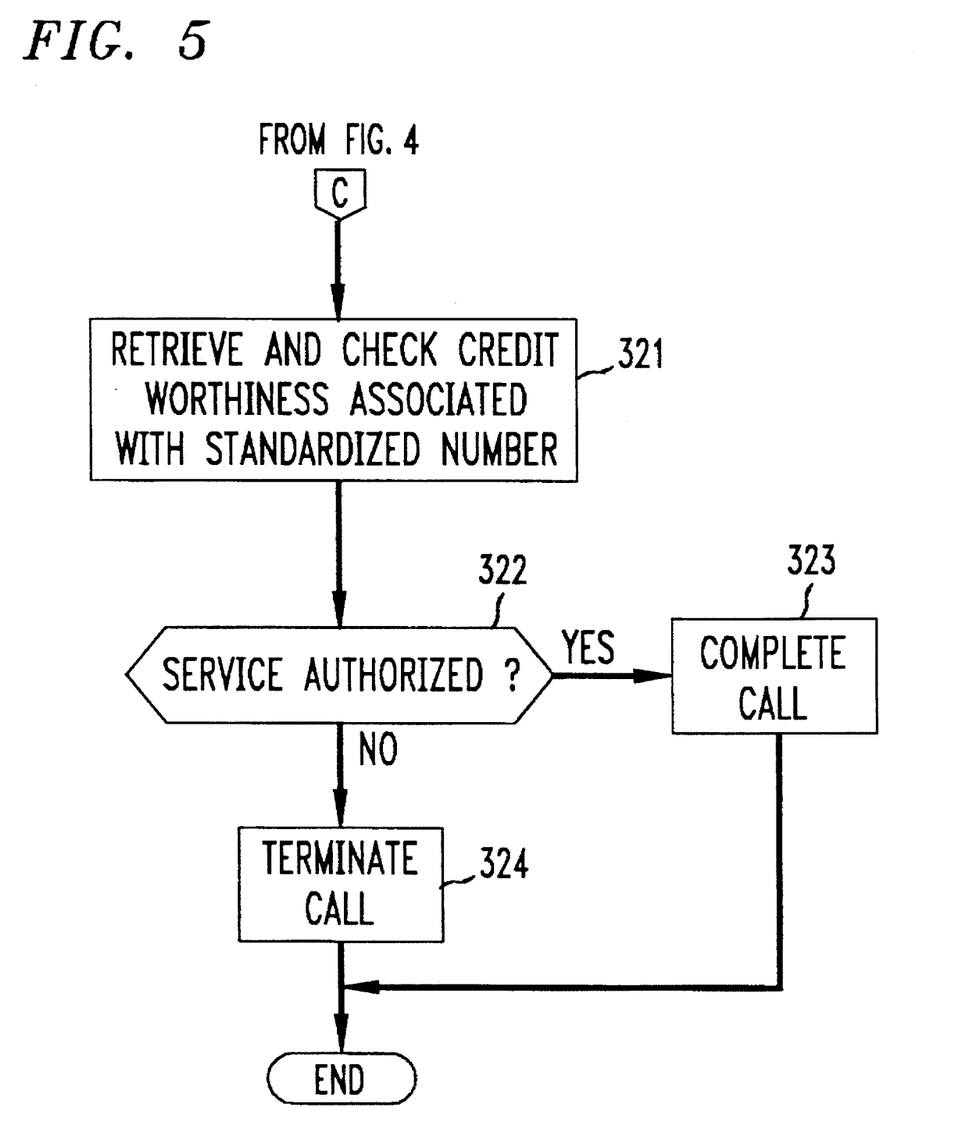

Looking now at FIGS. 3a, 3b, and 3c the method contemplated by the invention is initiated in step 301 when a calling card caller dials "0" followed by the ten-digit destination telephone number. In step 302, the call is routed by LEC switch 102 to the appropriate operator services system, in this case IXC operator services system 103. After the digits dialed by the caller have been received, voice processing system 105, in step 303 presents an announcement to the caller identifying the carrier servicing the call. Controller 104, in step 304 determines whether the caller has entered a calling card number. This is accomplished by controller 104 activating a timer after the announcement has been presented to the caller. Controller 104 is arranged to infer that no calling card number will be provided if the caller has not entered a calling card number within a predetermined period of time. In that case, controller 104 routes the call to attendant position 108 where the call is serviced, in step 306, by a live operator in conventional fashion for non-calling card calls or non-virtual calling card calls. When a calling card number is provided by the caller either to the operator or voice processing system 105, it is sent to card recognition database 106 for validation. In step 305, card recognition database 106 analyzes the sequence of digits in the calling card number to determine whether the calling card number is a virtual number. If it is not, the calling card call is processed in step 306 in a conventional manner.

However, if the calling card number is a virtual number, card recognition database 106, in step 307, analyzes the first six digits in the sequence to determine whether the virtual number is a prefix-formatted or free-form number. If it is free form, card recognition database 106, in step 308, forwards the virtual number to translation database 107 to compare the virtual number to the entries in the translation table illustrated in FIG. 2. In step 309, a determination is made as to whether the virtual number matches an entry in the translation table. If no match is found, in step 310, an unsuccessful validation attempt counter is incremented by "1". In step 311, the counter is compared to "1". If it is equal to 1, the caller is reprompted, in step 312, for the calling card number and steps 304 to 311 are repeated. If the unsuccessful validation attempt counter is not equal to 1, a determination is made, in step 313, as to whether it is greater than 2. If it is, translation database 107 sends a signal to card recognition database 106 which relays that signal to controller 104 to terminate the call. If the count is not greater than "2", in step 314, translation database 107 sends a signal to controller 104 via card recognition database 106 to prompt the caller for the identity of the card issuer. Illustratively, the following announcement may be presented to the caller: "If you are using an AT&T calling card, press 1; if you are using a NYNEX calling card, press 2; if you do not know who the calling card issuer is, press 3". If the caller is able to identify the card issuer, card recognition database 106, in step 320, launches a query to external card issuer validation database 109. The latter, upon recognizing that the card number is a virtual number, repeats steps 308 to 311 until the number is validated or the call is terminated due to excessive validation attempts. If the caller is unable to identify the card issuer, in step 316, a query is launched on all virtual card issuers' validation databases to authenticate the virtual card number. Subsequently steps 308 to 311 are repeated until a match is found or the call is terminated due to excessive validation attempts.

If the virtual card number is a prefix-formatted number, in step 317, card recognition database 106 compares the prefix of that number to the entries of the card issuer routing table mentioned above. In step 318, a determination is made as to whether the prefix of the virtual number matches an entry in the routing table. If as a result of the test in step 318, the prefix cannot be matched to an entry in the card issuer routing table, steps 310 to 313 described above, are performed. If the prefix matches an entry in the card issuer routing table, a determination is made in step 319 as to whether the card number needs to be validated by external card validation database 109. If so, step 320 (described above) is performed first, followed by steps 308 to 314. Otherwise, steps 308 to 314 are carried out.

If, as a result of the test in step 309, the virtual number matches an entry in the translation table, the standardized number corresponding to that entry is retrieved and forwarded by translation database 107 or external card issuer translation database 110 to card recognition database 106 or external card issuer validation database 109 which checks the credit worthiness associated with the the standardized number in step 321. A validation code is returned to controller 104 which determines in step 322, whether the caller is authorized to use the facilities of communications carrier network 112. Upon an affirmative answer to that inquiry, in step 323, the call is routed via communications carrier 112 to the called party at station set 113. If the call is not authorized, in step 324, the call is terminated.

The foregoing describes only illustrative embodiments of this invention. Persons skilled in the art can easily conceive of alternative arrangements providing functionality similar to these embodiments without any deviation from the fundamental principles or the scope of this invention. For example, even though this disclosure addresses primarily the needs of calling card issuers, this invention can also be used for other types of commercial cards such as credit cards, debit cards, etc.

I claim:

1. A method comprising the steps of:

receiving a telephone number and a calling card number provided by a caller initiating a calling card call;

retrieving from a database information needed to determine if said calling card number is a subscriber-selectable calling card number;

if said calling card number is a subscriber-selectable calling card number, mapping said subscriber-selectable calling card number to a previously stored standardized calling card number; and completing said calling card call to the telephone number provided by the caller; and charging said calling card call to said standardized calling card number.

2. The method of claim 1 further comprising the step of:

determining that said subscriber-selectable calling card number has a format that is different from the format of a) commercial credit card numbers conforming to the commercial credit card numbering plan formulated by the International Standards Organization and the American National Standards Institute, and b) calling card numbers conforming to the Bellcore calling card numbering plan described in Feature Service Document OSSGR FSD85-01-0100 TR-NWT-001177.

3. The method of claim 1 wherein said standardized number is a commercial credit card number.

4. The method of claim 1 wherein said standardized number is a calling card number conforming to a numbering plan for calling cards administered by Bellcore.

5. The method of claim 1 further comprising the step of:

terminating said call after a predetermined number of attempts to map said subscriber-selectable calling card number to a standardized calling card number.

6. The method of claim 1 wherein said retrieving step further includes the steps of:

analyzing at least the first three digits in the sequence of digits forming said received calling card number; and determining whether said digits form a prefix identifying a calling card issuer.

7. A method of administering the assignment of calling card numbers to calling card subscribers comprising the steps of:

receiving from a calling card subscriber a sequence of digits selected by said subscriber to be used as a calling card number;

assigning to said subscriber a non-Bellcore-standard-conforming calling card number which includes said sequence of digits;

assigning a standardized number to said non-Bellcore-standard-conforming calling card number; and loading said non-Bellcore-standard-conforming calling card number in association with said standardized number in a lookup table wherein said non-Bellcore-standard-conforming calling card number can be mapped to said associated standardized number whenever said non-Bellcore-standard-conforming calling card number is used by a caller to charge a call.

8. The method of claim 7 wherein said standardized number is a number conforming to an account numbering plan formulated by an industry-standard body of at least one of the telecommunications and financial services industries.

9. The method of claim 7 wherein said standardized number is a number conforming to a numbering plan for calling cards administered by Bellcore.

10. The method of claim 7 wherein said standardized number is a number conforming to a numbering plan for commercial credit cards formulated by the International Standards Organization and the American National Standards Institute.

11. The method of claim 7 wherein said step of assigning said non-Bellcore-standard-conforming number includes the step of:

prepending to said sequence of digits a prefix identifying the issuer of said calling card to form said non-Bellcore-standard-conforming calling card number.

12. The method of claim 7 wherein said assigning step of said non-Bellcore-standard-conforming number includes the step of:

prepending to said sequence of digits at least one telephone keypad special character to form said non-Bellcore-standard-conforming calling card number.

13. A system comprising:

means for receiving a telephone number and a calling card number provided by a caller initiating a calling card call;

means for retrieving from a database information needed to determine whether said calling card number is a subscriber-selectable calling card number;

means responsive to a determination that said received calling card number is a subscriber-selectable calling card number for mapping said subscriber-selectable calling card number to a standardized calling card number;

means for completing said calling card call to said standardized calling card number; and means for charging said calling card call to said standardized calling card number.

14. The system of claim 13 wherein said retrieving means further includes:

means for determining that said subscriber-selectable calling card number has a format that is different from the format of a) calling card numbers conforming to the Bellcore calling card numbering plan described in Feature Service Document OSSGR FSD85-01-0100 TR-NWT-001177, and b) commercial credit card numbers conforming to the commercial credit card numbering plan formulated by the International Standards Organization and the American National Standards Institute.

15. The system of claim 13 wherein said standardized calling card number is a commercial credit card number.

16. The system of claim 13 wherein said standardized calling card number is a calling card number conforming to a numbering plan for calling card numbers administered by Bellcore.

17. The system of claim 13 wherein said system further includes:

means for terminating said call after a predetermined number of attempts to map said subscriber-selectable calling card number to a standardized calling card number.

18. The system of claim 13 wherein said retrieving means further includes:

means for analyzing at least the first three digits in the sequence of digits forming said received calling card number; and means for determining whether said digits form a prefix identifying a calling card issuer.

19. The method of claim 1 further comprising the step of prompting said caller for information identifying an issuer of said calling card.

20. The system of claim 13 further comprising means for prompting said caller for information identifying an issuer of said calling card.

21. A method comprising the steps of:

receiving a credit card number in the course of a business transaction;

recognizing in a centralized database that said credit card number is a subscriber-selectable credit card number;

mapping said subscriber-selectable credit card number to a standardized credit card number; and charging a price associated with said business transaction to said standardized credit card number.

22. An apparatus comprising:

means for receiving a credit card number in the course of a business transaction;

means for recognizing in a centralized database that said credit card number is a subscriber-selectable credit card number;

means for mapping said subscriber-selectable credit card number to a standardized credit card number; and means for charging a price associated with said business transaction to said standardized credit card number.

\* \* \* \* \*